United States Patent Office 3,672,796
Patented June 27, 1972

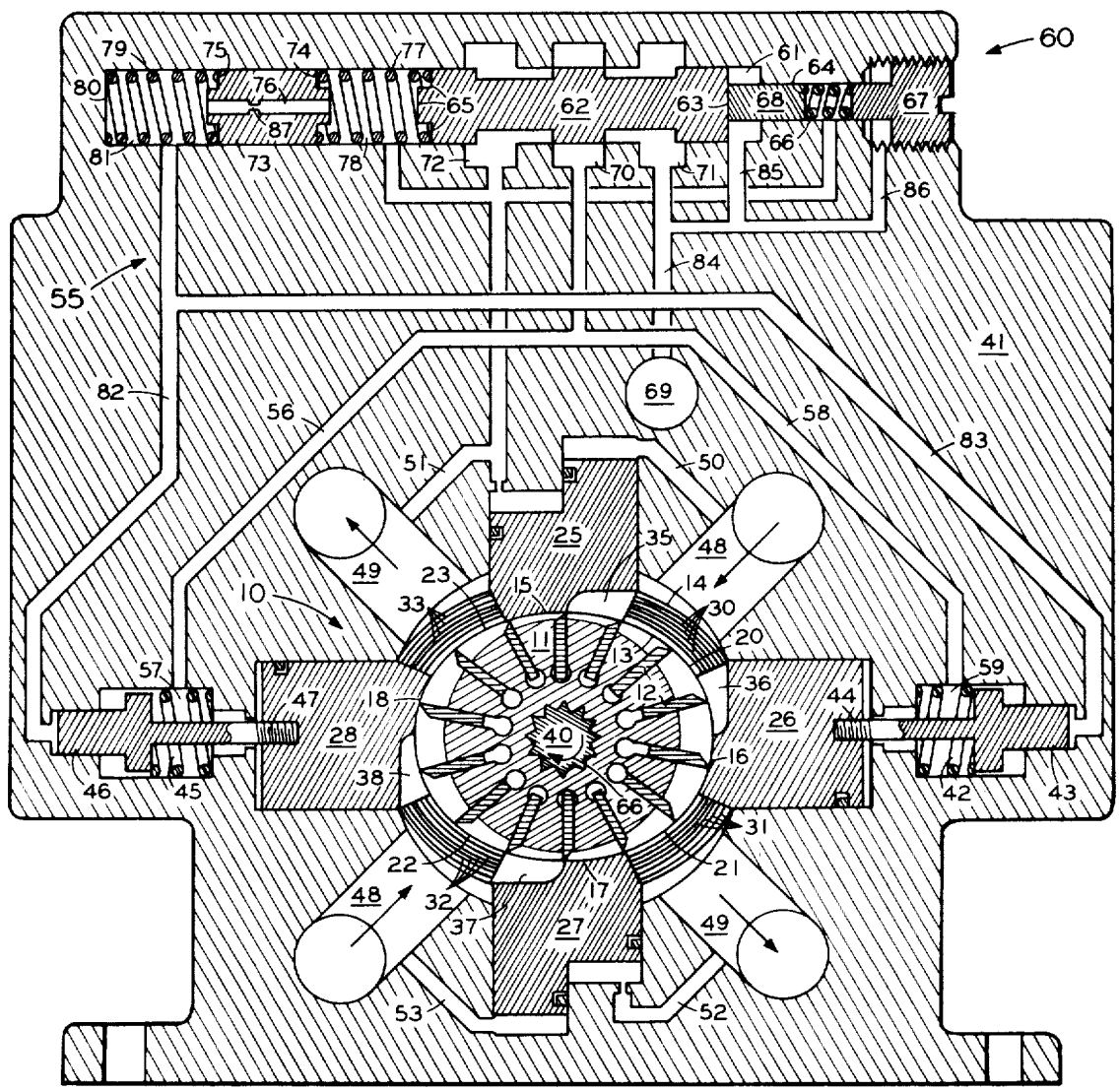

3,672,796
FLUID PRESSURE CONTROL
Robert K. Mitchell, Hilliard, Ohio, assignor to The Battelle Development Corporation, Columbus, Ohio
Filed Oct. 12, 1970, Ser. No. 80,038
Int. Cl. F01c *21/16;* F04c *15/04;* F16k *11/00*
U.S. Cl. 418—26                                                     19 Claims

ABSTRACT OF THE DISCLOSURE

A pressure control for a fluid device such as a variable-delivery pump. A servo valve has an elongate opening in which a control piston is longitudinally slidable about an equilibrium position where the forces of an adjustable compression spring and of the pump discharge pressure on a small surface at the right end are balanced by the discharge pressure on a larger surface at the left end. Increased discharge pressure moves the control piston to the right, applying the increased pressure to the flexible cam ring of the pump so as to reduce its eccentricity and the discharge rate. Decreased discharge pressure allows the control piston to move to the left, relieving pressure on the cam ring to increase its eccentricity and the discharge rate.

Oscillation of the control piston during changes in the discharge rate are substantially eliminated by a damping piston having a constricted longitudinal passage through it and positioned to the left of the control piston between compression springs. The space to the left of the damping piston communicates with a fluid pressure that is responsive to the eccentricity of the cam ring. As the control piston moves one way in response to a change in discharge pressure the damping piston moves in the opposite direction, thereby anticipatorily decelerating and minimizing overshoot by the control piston, which then returns to the equilibrium position as the damping piston moves oppositely to its equilibrium position and thus anticipatorily decelerate and minimizes oscillation by the control piston.

BACKGROUND OF THE INVENTION

This invention relates to fluid pressure controls. It has to do particularly with improved anticipatory damping means for substantially eliminating oscillations in such controls. The damping means of the present invention is entirely fluid actuated and assures stable operation even where the fluid pressure control must respond rapidly to maintain a pressure substantially constant in a fluid device.

In a typical preferred embodiment disclosed herein a fluid pressure control according to the present invention is used to control the discharge pressure of a variable-delivery fluid pump. The pump is a sliding-vane rotary moving-fluid pump as in FIG. 1 of U.S. patent application Ser. No. 15,377 of David L. Thomas for "Vane Tracking in Rotary Devices," now U.S. Pat. 3,604,823. It is similar to the pump in FIG. 13 of U.S. Pat. 3,514,232, of Robert K. Mitchell et al. In each of these pumps the cam ring is partially flexible and can be deformed to control its shape, and thus the delivery rate of the pump, by adjusting forces against the rigid portions of the cam ring. From the disclosure of the present embodiment it will be apparent how the pressure control can be applied in routine ways with other variable displacement pumps such as those in FIGS. 1–9 of U.S. Pats. 3,407,742 and 3,514,232, other types of variable delivery pumps such as those that are controlled by varying the tilt angle of the swash plate, fluid motors, and moving fluid devices in general. The present pressure control may be used also to improve the stability of static fluid devices such as other valves.

SUMMARY OF THE INVENTION

A typical pressure control according to the present invention for maintaining substantially constant pressure in a fluid device (such as a variable-delivery pump) comprises a valve having an elongate opening therein; a control piston longitudinally slidable in the opening; first pressure means for urging the control piston in a first direction; second pressure means, responsive to a variable pressure to be controlled in the device (such as the discharge pressure of a pump), for urging the control piston in the opposite direction; means responsive to the position of the control piston for increasing the variable pressure (as by increasing the rate of discharge from the pump) when the control piston moves in the first direction and for decreasing the variable pressure (as by decreasing the rate of discharge) when the control piston moves in the opposite direction; and fluid-actuated anticipatory damping means for modulating the urging force of the second pressure means on the control piston in a preselected manner to substantially eliminate oscillations during movement of the control piston, as during changes in the variable pressure (as during changes in the rate of discharge from the pump).

The first pressure means typically comprises means for applying an adjustable force to a first transverse surface of the control piston to select the magnitude of the pressure to be maintained in the fluid device. It may include means for communicating the pressure to be controlled (such as the discharge pressure of the pump) to a transverse surface smaller than the second transverse surface of the control piston, a compression spring contacting the smaller transverse surface, means for adjusting the compression on the spring, and means for transmitting the total force on the smaller transverse surface to the control piston.

The second pressure means typically comprises means for applying the variable pressure (such as the discharge pressure of the pump) to a second transverse surface of the control piston.

The damping means preferably comprises a damping piston longitudinally slidable in the opening, having a pair of transverse surfaces and a constricted passage therebetween, means (such as a compression spring) resiliently spacing one transverse surface of the damping piston from the second transverse surface of the control piston to form a first chamber in the opening communicating with the variable pressure (such as the discharge pressure of the pump), and means (such as a compression spring) resiliently spacing the other transverse surface of the damping piston from a transverse surface of the opening to form a second chamber in the opening. The second chamber typically communicates with a fluid pressure that changes oppositely from the variable pressure to be controlled (as by being responsive to the rate of discharge of the pump).

The constricted passage in the damping piston is of such size that as the control piston moves in a first direction in response to a change in the pressure to be controlled (such as the discharge pressure of the pump) the damping position moves in a second and opposite direction, thereby minimizing overshoot by the control piston, and as the control piston then returns in the second direction to its equilibrium position the damping piston moves in the first direction to its equilibrium position, thereby minimizing oscillation by the control piston. The characteristics of the resilient spacing means in the first and second chambers and the size of the constricted passage can be chosen such as to provide a predetermined delay characteristic in the communication of fluid between the chambers and the movement of the damping piston to its equilibrium position.

The second chamber typically communicates with a fluid pressure that is responsive to the position of a member that adjusts the pressure to be controlled (as by adjusting the rate of discharge of the pump). Movement of the control piston in the first direction communicates the pressure (as by the discharge rate) adjusting member with a passage for relieving the fluid pressure on the member, and movement of the control piston in the opposite direction communicates the member with the pressure to be controlled (such as the discharge pressure of the pump).

BRIEF DESCRIPTION OF THE DRAWING

The figure is a transverse sectional view of a typical pressure control according to the present invention as used to control the discharge pressure of a variable-delivery pump. The drawing is not to scale or in proportion.

DESCRIPTION OF PREFERRED EMBODIMENTS

Referring to the drawing, a variable-displacement sliding-vane rotary fluid pump 10 is shown wherein a cylindrical rotor 11 has vanes 12 slidable in substantially radial directions therein, the tip of each vane 12 maintaining substantial contact with the inner cylindrical surface 13 of a cam 14 surrounding the rotor 11 as it traverses sealing spaces 15, 16, 17, 18, and port spaces 20, 21, 22, 23 in the cam 14 alternately during rotation.

The sealing space 15 extends over the left half portion of a radially movable block 25; the sealing space 16 extends over the lower half portion of a radially movable block 26; the sealing space 17 extends over the right half portion of a radially movable block 27; and the sealing space 18 extends over the upper half portion of a radially movable block 28. Flexible laminations 30, connected at one end to the block 25 and at the other end to the block 26, are provided with ports (not shown) extending over the entire sector between the blocks 25 and 26. Flexible laminations 31, connected at one end to the block 26 and at the other end to the block 27, are provided with ports (not shown) extending over the entire sector between the blocks 26 and 27. Flexible laminations 32, connected at one end to the block 27 and at the other end to the block 28, are provided with ports (not shown) extending over the entire sector between the blocks 27 and 28. Flexible laminations 33, connected at one end to the block 28 and at the other end to the block 25, are provided with ports (not shown) extending over the entire sector between the blocks 28 and 25.

The ports in the laminations 30 communicate with a port 35 in the right half portion of the block 25 and with a port 36 in the upper half portion of the block 26. Thus, the port space 20 extends from the middle of the block 25 to the middle of the block 26. The port space 21 extends from the lower end of the block 26 to the right end of the block 27. The ports in the laminations 32 communicate with a port 37 in the left half portion of block 27 and with a port 38 in the lower half portion of block 28. Thus, the port space 22 extends from the middle of the block 27 to the middle of the block 28. The port space 23 extends from the upper end of the block 28 to the left end of the block 25. The blocks 25–28 and the laminations 30–33 are shaped and fixedly joined at their adjacent ends in such manner that when the blocks 25–28 are positioned at equal distances from the axis of the shaft 40, about which the rotor 11 rotates, the inner surface of the cam ring 13 is a right circular cylinder coaxial with the shaft 40 and the rotor 11. Thus, the inner surfaces of the blocks 25–28 forming the sealing spaces 15–18 and their respective adjacent ports 35–38 are sectors of the same circle in cross section.

The blocks 25–28 are radially movable from the positions just described where the inner surface 13 of the cam 14 is circular in cross section, through a continuous range of positions to the position shown in the drawing where the upper and lower blocks 25, 27 are substantially closer to the center of the shaft 40 than are the left and right blocks 28, 26, and where the inner surface 13 of the cam 14 is approximately elliptical in cross section. The positions between the two extremes are also approximately elliptical in cross section but of less eccentricity.

The right hand block 26 is forced outwardly by a compression spring 42 pressing resiliently between the housing 41 and a piston 43 on a rod 44 connected to the block 26. Similarily, the left hand block 28 is forced outwardly by a compressing spring 45 pressing resiliently between the housing 41 and a piston 46 on a rod 47 connected to the block 28. Fluid pressures are applied to the outer ends of the upper and lower blocks 25, 27 from the inlet ports 48 and the outlet ports 49 in the housing 41 through the passages 50, 51, 52, 53, to maintain the blocks 25, 27 firmly in the proper positions and to minimize vibration while the rotor 11 is rotating.

A pressure control 55 provides fluid under adjustable pressure through a passage 56 to a substantially fluid-tight chamber 57 adjacent the housing 41, containing the spring 45, the piston 46, and the rod 47, and communicating with the outer end of the left block 28. The pressure control 55 also supplies fluid under adjustable pressure through a passage 58 to a substantially fluid-tight chamber 59 adjacent the housing 41, containing the spring 42, the piston 43, and the rod 44, and communicating with the outer end of the right block 26. When the forces against the blocks 28, 26 from the fluid pressure from the pressure control 55 in the chambers 57, 59 is lower than the opposing forces of the springs 45, 42 and the fluid pressures at 48, 49, the cam 14 is maintained at its position of maximum eccentricity and maximum displacement as shown in the drawing. When the fluid pressure from the pressure control 55 provides sufficient forces against the outer ends of the blocks 28, 26 to exceed the opposing forces, the blocks 28, 26 are moved inwardly to reduce the eccentricity of the cam 14 and thus to reduce the rate of fluid displacement and the discharge pressure 49 of the pump 10. When the desired displacement or discharge pressure 49 is provided, the pressure in the passages 56, 58 from the pressure control 55 remains constant until the discharge pressure 49 of the pump 10 changes because of a change in operating conditions such as an increase or decrease in leakage or in load.

The pressure control 55 comprises a valve 60 having therein an elongate opening 61 in which a control piston 62 is longitudinally slidable. First pressure means for urging the control piston 62 in a first direction (to the left) comprises means for applying an adjustable force to a first transverse surface 63 at the right end of the control piston 62, and includes means for communicating the pressure to be controlled, which is the discharge pressure 49 of the pump 10, to a transverse surface 64 of a force transmitting piston 68. The surface 64 is smaller than a second transverse surface 65 at the left end of the control piston 62. A compression spring 66 contacts the smaller transverse surface 64, and a set screw 67 is provided for adjusting the compression of the spring 66 against the piston 68 which transmits the total force from the smaller transverse surface 64 to the control piston 62.

At the left end of the control piston 62 second pressure means, responsive to the variable pressure to be controlled (the discharge pressure 49 of the pump 10) are provided for urging the control piston 62 in the opposite direction (to the right), and comprises a chamber 78 communicating through the fluid passage 51 to the variable pressure (the discharge pressure 49 of the pump 10) for applying that pressure to the end surface 65 of the control piston 62.

Means responsive to the position of the control piston 62 are provided for increasing the variable pressure by increasing the rate of discharge from the pump 10 when the control piston 62 moves to the left and for decreasing the variable pressure by decreasing the rate of discharge when the control piston 62 moves to the right. The pressure responsive means includes a control pressure communicating region 70 in the opening 61, which is connected with the passages 56, 58; a pressure relief region 71 in the opening 61 communicating with a case drain region 69 of the pump 10; and a discharge pressure region 72 in the opening 61 communicating through the fluid passage 51 with the discharge pressure 49 of the pump 10.

Whenever the total adjustable force on the right end 63 of the control piston 62 exceeds the force from the discharge pressure 49 on the left end 65, as when the pump 10 is being started from rest, or when the set screw 67 is turned to increase the compression of the spring 66, or when the load on the output 49 of the pump 10 decreases (as by an increase in leakage in a device connected to the output 49), the control piston 62 moves to the left, thus communicating the control pressure region 70 with the pressure relief region 71. This action communicates the members 26 (connected to the piston 43) and 28 (connected to the piston 46), which adjust the rate of discharge, and thereby the discharge pressure, of the pump 10, via the passages 56, 58 and the pressure control region 70 to the pressure relief region 71 and from there through a fluid passage 84 to the rate adjusting members 26, 28. The reduced pressure permits the members 26, 28 to move outward and thus to increase the eccentricity of the cam ring 14, the discharge rate of the pump 10, and the discharge pressure 49.

Whenever the force of the discharge pressure 49 on the left end 65 of the control valve 62 exceeds the adjustable force on the right end 63, as when the speed of rotation of the shaft 40 is increased, or when the set screw 67 is adjusted to reduce the compression of the spring 66, or when the load on the output 49 of the pump 10 is increased (as by a reduction in leakage in a device connected to the output 49), the control piston 62 moves to the right, communicating the discharge pressure region 72 with the control pressure region 70. This action communicates the discharge pressure 49 via the passage 51, the discharge pressure region 72, the control pressure region 70, and the passages 56, 58 to the discharge rate adjusting members 26, 28, thereby pressing them inward and thus reducing the eccentricity of the cam ring 14, the discharge rate of the pump 10, and the discharge pressure 49.

In the automatic pressure controlling operations just described, oscillations of the control piston 62 and oscillations in the delivery rate and discharge pressure 49 of the pump 10 might be present to a detrimental extent were it not for the fluid actuated anticipatory damping means that is provided for modulating the urging force of the second pressure means on the control piston 62 in a preselected manner to substantially eliminate oscillations during movement of the control piston 62 especially during changes in the variable pressure to be controlled (the discharge pressure 49 as influenced by the rate of discharge from the pump 10).

The damping means, which is entirely fluid actuated, comprises a damping piston 73 longitudinally slidable in the opening 61, having a pair of transverse surfaces 74, 75, at the right and left ends respectively, and a constricted passage 76 therebetween. A compression spring 77 resiliently spaces the right end surface 74 of the damping piston 73 from the second transverse surface 65 at the left end of the control piston 62 to form a first chamber 78 in the opening 61 communicating via the fluid passage 51 with the discharge pressure 49 of the pump 10, which is the variable pressure to be controlled. A compression spring 79 resiliently spaces the left end surface 75 of the damping piston 73 from the transverse surface 80 at the left end of the opening 61 to form a second chamber 81 in the opening 61.

The second chamber 81 communicates via fluid passages 82, 83 with a fluid pressure that changes oppositely from the variable pressure to be controlled, by being responsive to the rate of discharge of the pump 10 as the discharge rate changes oppositely from the variable pressure to be controlled, to counteract and thus eliminate any change in the variable pressure to be controlled. The fluid pressure in the passages 82, 83 is responsive to the position of the piston 46 in the chamber 57 connected at 47 to the member 28 and the position of the piston 43 in the chamber 59 connected at 44 to the member 26, the members 26, 28 being the ones that adjust the discharge pressure 49 by adjusting the rate of discharge of the pump 10.

The pressure in the fluid passages 82, 83 is increased when the rate of discharge of the pump 10 is increased by the pressure control 55 to counteract a decrease in the discharge pressure 49, and is decreased when the rate of discharge of the pump 10 is decreased by the pressure control 55 to counteract an increase in the discharge pressure 49; the fluid pressure in the passages 82, 83 and in the second chamber 81 being responsive to the positions of the members 26, 28 that adjust the pressure to be controlled (the discharge pressure 49) by adjusting the rate of discharge of the pump 10. The positions of the adjusting members 26, 28 are transmitted by the pistons 43, 46 connected respectively thereto, increasing the pressure of the fluid in the passages 82, 83 and the second chamber 81 (or just increasing the volume of the fluid in the second chamber 81, if the fluid is incompressible) when the members 26, 43; 28, 46; are moved outwardly by the pressure control 55 by decreased pressure in the control pressure chamber 70, the passages 56, 58, and the chambers 57, 59, by the adjusting action of the control 55 to counteract a decrease in the discharge pressure 49. Similarly, the positions of the adjusting members 26, 28 are transmitted by the pistons 43, 46 connected respectively thereto, decreasing the pressure of the fluid in the passages 82, 83 and the second chamber 81 (or just decreasing the volume of the fluid in the second chamber 81, if the fluid is incompressible) when the members 26, 43; 28, 46; are moved inwardly by the pressure control 55 by increased pressure in the control pressure chamber 70, the passages 56, 58, and the chambers 57, 59, by the adjusting action of the control 55 to counteract an increase in the discharge pressure 49.

The constricted passage 76 in the damping piston 73 is of such size that as the control piston 62 moves in a first direction in response to a change in the pressure to be controlled (the discharge pressure 49 of the pump 10) the damping piston 73 moves in a second and opposite direction, thereby anticipatorily decelerating the movement of the control piston 62 and thus minimizing overshoot by the control piston 62; and then as the control piston 62 returns in the second direction to its equilibrium position the damping piston 73 moves in the first direction to its equilibrium position, thereby anticipatorily decelerating the movement of the control piston 62 and thus minimizing oscillation by the control piston 62.

More specifically, when the control piston 62 moves to the right in response to an increase in the discharge pressure 49 of the pump 10, as communicated through the fluid passage 51 to the first chamber 73, the damping piston 73 moves to the left, ordinarily after a small time delay, in response to the inward movement of the pistons 43, 46 as described above. The movement of the damping piston 73 to the left further enlarges the first chamber 78, reducing the movement of the control piston 62 to the right by a small amount and thereby minimizing overshoot by the control piston 62 and the discharge rate adjusting members 26, 28. Fluid from the first chamber 78 slowly bleeds through the constricted passage 76 in the damping piston 73 to the second chamber 81, and as the control piston 62 returns ot the left to its equilibrium position the damping piston 73 moves, ordinarily more slowly than the control piston 62, to the right to its equilibrium position, thereby permitting the control piston 62 to coast more gradually to its equilibrium position and minimizing oscillation by the control piston 62 and the discharge rate adjusting members 26, 28.

When the control piston 62 moves to the left in response to a decrease in the discharge pressure 49 of the pump 10, as communicated through the fluid passage 51 to the first chamber 78, the damping piston 73 moves to the right, ordinarily after a small time delay, in response to the outward movement of the pistons 43, 46 as described above. The movement of the damping piston 73 to the right further reduces the size of the first chamber 78, decelerating (or braking) the movement of the control piston 62 to the left by a small amount and thereby minimizing overshoot by the control piston 62 and the discharge rate adjusting members 26, 28. Fluid from the second chamber 81 slowly bleeds through the constricted passage 76 in the damping piston 73 to the first chamber 78, and as the control piston 62 returns to the right to its equilibrium position the damping piston 73 moves, ordinarily more slowly than the control piston 62, to the left to its equilibrium position, thereby decelerating the control piston 62 and thus causing it to coast more gradually to its equilibrium position and minimizing oscillation by the control piston 62 and the discharge rate adjusting members 26, 28.

Taking into account the areas of the end surfaces 74, 75 of the damping piston 73 and the forces and other operating conditions in the pressure control 55, the characteristics of the resilient spacing means (the compression springs 77, 79) in the first chamber 78 and the second chamber 81, as well as the size of the constricted passage 76 (including its length and cross-section, but primarily the cross-section of the most constricted region 87 if the cross-section is not uniform), can be chosen such as to provide a predetermined delay characteristic in the communication of fluid between the chambers 78, 81 and return movement of the damping piston 73 to its equilibrium position. Thus the damping means can be designed to provide optimum conditions of operation in the pressure control 55 and in the pump 10. The passage 76 may of course be shaped differently. It may comprise a plurality of narrower channels, or even the space between the damping piston 73 and the wall of the opening 61, if the size and shape of the damping piston 73 are so chosen as to provide such a space having the proper dimensions.

The anticipatory action provided by the movement of the damping piston 73, responsive largely to the displacement or flow signal fed back to the second chamber 81, decelerates the movement of the control piston 62 by the right amounts and at the right times to bring it to a gradual stop at its equilibrium (or neutral) position shown in the drawing at substantially the same time when the fluid flow reaches the value that provides the desired value of the discharge pressure 49 as selected by the adjustment of the set screw 67. Thus the discharge pressure 49 can be maintained substantially constant over a wide range of load and flow conditions.

While the pressure control 55 is acting to correct for a deviation in the discharge pressure 49, the pressure 49 temporarily becomes an inverse function of flow. In other words, a temporary drop is provided in the pressure versus flow characteristic. But at all other times the discharge pressure 49 is substantially constant at a value that is selected by adjusting the set screw 67.

For most purposes the set screw 67 need not be moved frequently, and ordinarily is adjusted manually. However, it may be adjusted by automatic means to vary the discharge pressure 49 according to predetermined programs or in response to detected conditions, as may be desired.

So that the force transmitting piston 68 and the set screw 67 need not be provided with special seals in the opening 61, fluid passages 85, 86 are provided, communicating the adjacent regions of the opening 61 with the fluid passage 84 to the case drain region 69 of the pump 10, to permit any fluid that may leak from the region of the compression spring 66 to drain away from the opening 61.

Various details of the pressure control 55 can of course be modified in obvious ways. For example, one of the pistons 43 or 46 and its fluid passage 83 or 82 could be omitted, leaving the second chamber 81 to communicate with a fluid passage 82 or 83 that is responsive to the position of just one member 46 or 43 connected to a member 28 or 26 that adjusts the rate of discharge of the pump 10. In fact in some systems satisfactory operation can be obtained even without such feedback to the second chamber 81, which may then comprise merely a closed region at the left end of the opening 61. Conventional portions of the pressure control 55 may of course be replaced with other substantially equivalent components or arrangements.

While the form of the invention herein disclosed constitutes a presently preferred embodiment, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:
1. A pressure control for maintaining substantially constant pressure in a fluid device, comprising:
   a valve having an elongate opening therein;
   a control piston longitudinally slidable in the opening;
   first pressure means applied to a first transverse surface of the control piston for urging it in a first direction;
   second pressure means, responsive to a variable pressure to be controlled in the device, for urging the control piston in the opposite direction by applying the variable pressure to a second transverse surface of the control piston;
   means responsive to the position of the control piston for increasing the variable pressure when the control piston moves in the first direction and for decreasing the variable pressure when the control piston moves in the opposite direction;
   fluid-actuated anticipatory damping means for modulating the urging force of the second pressure means on the control piston in a preselected manner to substantially eliminate oscillations during movement of the control piston;
   the second pressure means comprising means for applying the variable pressure to the second transverse surface of the control piston; and
   the damping means comprising a damping piston longitudinally slidable in the opening, having a pair of transverse surfaces and a constricted passage therebetween, means resiliently spacing one transverse surface of the damping piston from the second transverse surface of the control piston to form a first chamber in the opening communicating with the variable pressure, and means resiliently spacing the other transverse surface of the damping piston from a transverse surface of the opening to form a second chamber in the opening.

2. A pressure control as in claim 1, wherein the first pressure means comprises means for applying an adjustable force to the first transverse surface of the control piston to select the magnitude of the pressure to be maintained in the fluid device.

3. A pressure control as in claim 1, wherein the second chamber communicates with a fluid pressure that changes oppositely from the variable pressure to be controlled.

4. A pressure control as in claim 3, wherein the constricted passage in the damping piston is of such size that as the control piston moves in a first direction in response to a change in the pressure to be controlled the damping piston moves in a second and opposite direction, thereby minimizing overshoot by the control piston, and as the control piston then returns in the second direction to its equilibrium position the damping piston moves in the first direction to its equilibrium position, thereby minimizing oscillation by the control piston.

5. A pressure control as in claim 4, wherein the characteristics of the resilient spacing means in the first and second chambers and the size of the constricted passage are chosen such as to provide a predetermined delay characteristic in the communication of fluid between the chambers and the movement of the damping piston to its equilibrium position.

6. A pressure control as in claim 5, wherein each resilient spacing means comprises a compression spring.

7. A pressure control as in claim 6, wherein the first pressure means comprises means for communicating the pressure to be controlled to a transverse surface smaller than the second transverse surface of the control piston, a compression spring contacting the smaller transverse surface, means for adjusting the compression on the spring, and means for transmitting the total force on the smaller transverse surface to the control piston.

8. A pressure control as in claim 3, wherein the second chamber communicates with a fluid pressure that is responsive to the position of a member that adjusts the pressure to be controlled.

9. A pressure control as in claim 8, wherein movement of the control piston in the first direction communicates the pressure adjusting member with a passage for relieving the fluid pressure on the member, and movement of the control piston in the opposite direction communicates the member with the pressure to be controlled.

10. A pressure control as in claim 1, wherein the device is a variable-delivery pump, the variable pressure to be controlled is the discharge pressure of the pump, and the means responsive to the position of the control piston increases the rate of discharge from the pump when the control piston moves in the first direction and decreases the rate of discharge when the control piston moves in the opposite direction.

11. A pressure control as in claim 10, wherein the second pressure means comprises means for applying the discharge pressure of the pump to the second transverse surface of the control piston.

12. A pressure control as in claim 13, wherein the first chamber in the opening communicates with the discharge pressure of the pump.

13. A pressure control as in claim 12, wherein the second chamber communicates with a fluid pressure that is responsive to the rate of discharge of the pump.

14. A pressure control as in claim 13, wherein the constricted passage in the damping piston is of such size that as the control piston moves in a first direction in response to a change in the discharge pressure of the pump the damping piston moves in a second and opposite direction, thereby minimizing overshoot by the control piston, and as the control piston then returns in the second direction to its equilibrium position the damping piston moves in the first direction to its equilibrium position, thereby minimizing oscillation by the control piston.

15. A pressure control as in claim 14, wherein the characteristics of the resilient spacing means in the first and second chambers and the size of the constricted passage are chosen such as to provide a predetermined delay characteristic in the communication of fluid between the chambers and the movement of the damping piston to its equilibrium position.

16. A pressure control as in claim 15, wherein each resilient spacing means comprises a compression spring.

17. A pressure control as in claim 16, wherein the first pressure means comprises means for communicating the dicharge pressure of the pump to a transverse surface smaller than the second transverse surface of the control piston, a compression spring contacting the smaller transverse surface, means for adjusting the compression on the spring, and means for transmitting the total force on the smaller transverse surface to the control piston.

18. A pressure control as in claim 13, wherein the second chamber communicates with a fluid pressure that is responsive to the position of a member that adjusts the rate of discharge of the pump.

19. A pressure control as in claim 18, wherein movement of the control piston in the first direction communicates the discharge rate adjusting member with a passage for relieving the fluid pressure on the member, and movement of the control piston in the opposite direction communicates the member with the discharge pressure of the pump.

References Cited
UNITED STATES PATENTS

| | | | |
|---|---|---|---|
| 2,606,503 | 8/1952 | Shaw | 418—30 |
| 3,549,281 | 12/1970 | Schink et al. | 418—31 |
| 2,938,469 | 5/1960 | Lauck | 418—26 |
| 3,514,232 | 5/1970 | Mitchell et al. | 418—27 |

C. J. HUSAR, Primary Examiner

J. J. VRABLIK, Assistant Examiner

U.S. Cl. X.R.

137—102, 625.66, 625.69; 418—27, 31

PO-1050
(5/69)

UNITED STATES PATENT OFFICE
CERTIFICATE OF CORRECTION

Patent No. 3,672,796  Dated June 27, 1972

Inventor(s) Robert K. Mitchell

It is certified that error appears in the above-identified patent and that said Letters Patent are hereby corrected as shown below:

Column 9, line 43, reference claim should read -- 11 -- instead of "13".

Signed and sealed this 17th day of October 1972.

(SEAL)
Attest:

EDWARD M. FLETCHER, JR.
Attesting Officer

ROBERT GOTTSCHALK
Commissioner of Patents